US007959058B1

(12) United States Patent
Crane et al.

(10) Patent No.: US 7,959,058 B1
(45) Date of Patent: Jun. 14, 2011

(54) HYBRID COMPOSITE WELDED JOINT

(75) Inventors: Roger M. Crane, Arnold, MD (US);
Robert DeNale, Frederick, MD (US);
Harry E. Prince, Ijamsville, MD (US);
Timothy L. Dapp, Crofton, MD (US);
George C. Tunis, III, Berlin, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1403 days.

(21) Appl. No.: 11/340,009

(22) Filed: Jan. 13, 2006

Related U.S. Application Data

(60) Provisional application No. 60/643,169, filed on Jan. 13, 2005.

(51) Int. Cl.
*B23K 31/02* (2006.01)
*B32B 38/08* (2006.01)
*B32B 15/14* (2006.01)

(52) U.S. Cl. ............... 228/122.1; 228/120; 428/608; 428/615

(58) Field of Classification Search ....... 228/120–122.1, 228/135–140, 175–178; 244/123.1–124; 428/293.1, 608, 615; 156/245, 258, 304.5
See application file for complete search history.

(56) References Cited

U.S. PATENT DOCUMENTS

| 3,867,239 | A | 2/1975 | Alesi et al. |
| 4,320,898 | A | 3/1982 | Brunst et al. |
| 4,581,527 | A | 4/1986 | Crane et al. |
| 4,695,344 | A | 9/1987 | Crane et al. |

(Continued)

FOREIGN PATENT DOCUMENTS

WO    WO 2004028731 A1 *    4/2004

OTHER PUBLICATIONS

Robert Matteson and Roger M. Crane, "Flexural Testing of Steel Wire Composite Beams Made with Hardwire™ Unidirectional Tape," NSWCCD-65-TR-2003/48, Naval Surface Warfare Center, Carderock Division, face-dated Nov. 2003 but never published; available online (first public disclosure) beginning on or about Mar. 1, 2004 at the Hardwire LLC website, http://www.hardwirellc.com (20 pages).

(Continued)

*Primary Examiner* — Jessica L Ward
*Assistant Examiner* — Kevin E Yoon
(74) *Attorney, Agent, or Firm* — Howard Kaiser (57) ABSTRACT

The present invention's composite-to-metal attachment methodology—bolt-free and adhesive-free—features the implementation of an intermediary structure containing metallic fibrous material. The intermediary structure couples a first adherend (which contains nonmetallic fibrous material) with a second adherend (which contains metallic nonfibrous material). The intermediary structure's fibrous attribute is availed of for effecting its co-cure attachment to the first adherend. The intermediary structure's metallic attribute is availed of for effecting its weld attachment to the second adherend. According to typical inventive practice, respective panels of the first adherend and the intermediary structure are arranged and connected so as to describe a stepped configuration at the interface between the first adherend and the intermediary structure. The first adherend and a first portion of the intermediary structure are co-impregnated with a uniform resinous system and are co-cured. A second portion of the intermediary structure is welded with respect to the second adherend.

14 Claims, 9 Drawing Sheets

U.S. PATENT DOCUMENTS

| | | | |
|---|---|---|---|
| 4,793,727 | A | 12/1988 | Schmaling |
| 4,954,377 | A | 9/1990 | Fischer et al. |
| 5,023,845 | A | 6/1991 | Crane et al. |
| 5,108,262 | A | 4/1992 | Crane |
| 5,261,616 | A | 11/1993 | Crane et al. |
| 5,284,697 | A | 2/1994 | Crane et al. |
| 5,288,114 | A | 2/1994 | Crane et al. |
| 5,308,675 | A | 5/1994 | Crane et al. |
| 5,348,052 | A | 9/1994 | Crane et al. |
| 5,348,513 | A | 9/1994 | Heddon |
| 5,349,738 | A | 9/1994 | Crane et al. |
| 5,358,929 | A * | 10/1994 | Fujikami et al. ............... 505/100 |
| 5,379,711 | A | 1/1995 | Fischer et al. |
| 5,447,765 | A | 9/1995 | Crane et al. |
| 5,505,030 | A | 4/1996 | Michalcewiz et al. |
| 5,573,344 | A | 11/1996 | Crane et al. |
| 5,654,053 | A | 8/1997 | Crane et al. |
| 5,693,166 | A | 12/1997 | Crane et al. |
| 5,721,034 | A | 2/1998 | Seemann, III et al. |
| 5,744,221 | A | 4/1998 | Crane et al. |
| 5,833,782 | A | 11/1998 | Crane et al. |
| 5,862,975 | A * | 1/1999 | Childress ...................... 228/120 |
| 5,904,972 | A | 5/1999 | Tunis, III et al. |
| 5,958,325 | A | 9/1999 | Seemann, III et al. |
| 5,972,524 | A * | 10/1999 | Childress ..................... 428/615 |
| 5,984,563 | A | 11/1999 | Wu |
| 6,053,664 | A | 4/2000 | Crane et al. |
| 6,159,414 | A | 12/2000 | Tunis, III et al. |
| 6,283,677 | B1 | 9/2001 | Slattery et al. |
| 6,500,507 | B1 | 12/2002 | Fisher |
| 6,540,442 | B1 | 4/2003 | Slattery et al. |
| 6,582,539 | B2 * | 6/2003 | Iwanczyk et al. ............. 156/73.5 |
| 6,601,357 | B2 | 8/2003 | Tunis, III et al. |
| 6,698,148 | B1 | 3/2004 | Manna et al. |
| 6,699,341 | B2 | 3/2004 | Conzone et al. |
| 6,718,713 | B2 * | 4/2004 | McKague et al. ......... 52/309.13 |
| 6,773,655 | B1 | 8/2004 | Tunis, III et al. |
| 6,799,126 | B1 | 9/2004 | Ratcliffe et al. |
| 6,807,891 | B2 | 10/2004 | Fisher |
| 6,811,877 | B2 | 11/2004 | Haislet et al. |
| 6,823,916 | B2 | 11/2004 | Grosskrueger et al. |
| 6,828,016 | B2 | 12/2004 | Mitani et al. |
| 6,861,131 | B2 | 3/2005 | Evans |
| 6,884,054 | B2 * | 4/2005 | Shimada ...................... 425/107 |
| 7,144,625 | B2 | 12/2006 | Tunis |
| 7,200,973 | B2 | 4/2007 | Tunis |
| 7,667,158 | B2 * | 2/2010 | Dance et al. ............. 219/121.66 |
| 2002/0000492 | A1 * | 1/2002 | Schmidt ........................ 244/125 |
| 2002/0185207 | A1 * | 12/2002 | Iwanczyk et al. ............ 156/73.5 |
| 2004/0247826 | A1 | 12/2004 | Conzone et al. |
| 2009/0087259 | A1 | 4/2009 | Bettinger |
| 2009/0095147 | A1 | 4/2009 | Tunis |
| 2009/0169855 | A1 | 7/2009 | Tunis |

OTHER PUBLICATIONS

Stephen M. Graham, "Stress Analysis of a Co-Cured Innovative Hybrid Joint for Marine Composites," SAMPE (Society for the Advancement of Material and Process Engineering) 2004, May 16-20, 2004, Long Beach, California (14 pages).

Stephen M. Graham, Tad Robbins, and Roger M. Crane, "Influence of Joint Geometry on Tensile Strength of a Co-Cured Symmetric Stepped-Lap Joint," SAMPE (Society for the Advancement of Material and Process Engineering) 2005, May 1-5, 2005, Long Beach, California (14 pages).

Faye Smith, "Comeld™," TWI Knowledge Summary, TWI website, http://www.twi.co.uk/j32k/unprotected/band_1/ksfcs002.html, 7 pages printed out on Dec. 2, 2005.

"Comeld Advances Composite-to-Metal Joining," NetComposites website, http://www.netcomposites.net/news.asp?2100, 2 pages printed out on Dec. 2, 2005.

Tad J. Robbins, "Evaluation of a Composite and Metal Hybrid Co-Cured Joint," Bowman Scholar Program: Project Abstracts for AY05, Mechanical Engineering Department, U.S. Naval Academy website, http://www.usna.edu/BowmanProgram/Bowman05/Bowmanabstr05.htm, 1 page printed out on Dec. 11, 2005.

"Welcome to HardwireLLC.com," Hardwire LLC website home page, http://www.hardwirellc.com, 1 page printed out on Mar. 10, 2006.

"Hardwire Receives Second Technology Patent," Hardwire LLC website news section, http://www.hardwirellc.com/news/050207_patent_II.html, 1 page printed out on Sep. 8, 2008.

"First Hardwire® Patent Issued," Hardwire LLC website news section, http://www.hardwirellc.com/news/archive/121306_first_patent.html, 1 page printed out on Sep. 8, 2008.

Roger M. Crane, John W. Gillespie, Jr., Dirk Heider, Shridhar Yalagadda, and Suresh G. Advani, "Intelligent Processing and Inspection of Naval Composites," Advanced Materials and Processes Technology Information Analysis Center (AMPTIAC), The AMPTIAC Quarterly, vol. 7, No. 3, pp. 41-48 (Oct. 27, 2003).

* cited by examiner

HYBRID COMPOSITE WELDED JOINT

CROSS-REFERENCE TO RELATED APPLICATIONS

This application claims the benefit of U.S. provisional application No. 60/643,169, filed 13 Jan. 2005, hereby incorporated herein by reference, entitled "Hybrid Joint," joint inventors Roger M. Crane, Robert DeNale, Harry E. Prince, and Timothy L. Dapp.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to composites and composite materials, more particularly to methods and configurations for joining composite structures to other composite structures or to non-composite structures.

Many structural applications require the joining of composites to composites, or composites to metals. These kinds of joints are often technologically challenging. Conventional approaches to joining composites with other composites or with metals include mechanical fastening (e.g., bolting), adhesive bonding, co-curing, and secondary bonding. A common design for mechanical fastening is a lap joint, which is typically formed by overlapping two panels, then match-drilling holes in the two panels, and then inserting bolts to fasten together the two panels. A common design for adhesive bonding is a scarf joint, which is typically formed by matching the respective tapered edges of two panels, and applying an adhesive material so as to achieve a uniform thickness joint having an adhesive bond line between the two matched tapered edges. Scarf joints also lend themselves to co-curing or secondary bonding, either of which obviates the need for adhesive bonding. According to typical co-curing technique, a joint involving two uncured panels is laid up and cured in one step. According to typical secondary bonding technique, an uncured panel is laid onto a previously cured panel and attached thereto via a second cure.

The aerospace industry has considerable experience with fabrication of composite-to-metal joints. In aerospace structure technology, mechanical fastening and adhesive bonding are the two most popular approaches to joining composite materials with metal materials. Prevalent in aerospace applications is a "bolted-bonded" configuration, in which mechanical fastening and adhesive bonding are combined to create redundant load paths in a structure. Bolted-bonded configurations are also seen in marine applications involving the joining of composite components to metallic structures; however, adhesives are susceptible to degradation in aqueous environments. An adhesive bond entails not one but two interfaces that are prone to disbonding, namely, the respective interfaces between the adhesive layer and the two adherends. Therefore, regardless of whether it is used alone or in combination with mechanical fastening, adhesive bonding is viewed much less favorably in the marine realm than it is in the aerospace realm. Moreover, for many marine structures, the sizes and shapes of the structural sub-assemblies prohibit the use of either co-curing or secondary bonding as a joining technique. Accordingly, mechanical fastening (e.g., bolted joints) has been widespread in the marine industry as an exclusive joining technique.

Mechanical fastening can be utilized to great benefit but has several drawbacks. Since composites tend to be sensitive to damage under high bearing pressures, a lap joint must be carefully designed in order to carry the intended loads without accumulating damage in the vicinity of the bolt-holes in the composite. Commentators have cautioned that maintaining close fit-up between the holes and the bolts, and between the members being joined, is important for maximizing fatigue performance. Some composites also exhibit low temperature creep that leads to loss of preload in the bolts and accelerates damage, a proclivity that may necessitate regular maintenance of the bolted joints to maintain preload. The advantageousness of composites in terms of weight savings may be vitiated by bolted joints because of the weight of the bolts, and because the composite panel thickness is often increased in the vicinities of the bolted joints to decrease the bearing stresses in the composite.

Bolted lap joints may be impractical for outer hull applications where hydrodynamics (or aerodynamics) is a consideration, because a simple lap joint entails at least one "step" (where the lapped panels overlap) on the hull structure's surface. Although bolted flange joints can be used for attachment of hull sections, these are significantly heavier than bolted lap joints. A tapered lap joint configuration (in which the panels of a lap joint are tapered on the edges) can be adopted so as to ameliorate the negative effects of the overlaps on the hull structure's hydrodynamic (or aerodynamic) characteristics. As distinguished from a tapered lap joint, the above-mentioned scarf joint matches (interfaces) the tapered edges of panels so as to achieve a uniform thickness joint; typically, adhesive bonding is implemented where the respective tapered edge surfaces of the panels are matched up. A scarf joint, if properly designed, can achieve a uniform shear stress in the bond line, thus representing a highly efficient joint. Theoretically, at least, the potential efficiency of an adhesive joint is superior to that of a mechanical joint, since an adhesive joint is theoretically capable of achieving one hundred percent of the laminate strength. Nevertheless, as previously noted herein, marine use of adhesive bonding can be problematical due to the tendency of adhesive materials to degrade in aqueous environments.

SUMMARY OF THE INVENTION

In view of the foregoing, it is an object of the present invention to provide a improved methodology for joining a nonmetallic composite (e.g., fiber-reinforced matrix) structure and a metallic non-composite (e.g., monolithic) structure.

The United States Navy utilizes various nonmetallic composite structures, typically lightweight, on the decks of naval ships. Heretofore the most commonly practiced approach to attaching a composite structure to a naval vessel surface has combined extensive mechanical bolting with adhesive bonding. Some combined mechanical-adhesive approaches, for instance, have involving lap joint attachment between overlapping panels. The present invention succeeds in effecting attachment of composite structures to a metallic substrate, such as the steel deck of a marine vessel, in such a way as to avoid both mechanical fastening (and its associated shortcomings, including deterioration of the bolting through-holes in the composite, loss of preload in the bolts, excessive weight of the bolts, compromise of hydrodynamic or aerodynamic properties, etc.) and adhesive bonding (and its associated shortcomings, including susceptibility to damage caused by an aqueous environment, susceptibility to disbonding, etc.). The present invention's novel attachment methodology is lighter, less extensive, less cumbersome, less costly, and less vulnerable to environmental and other deleterious influences than are the currently known attachment methodologies involving combination of bolting and adhering.

Noteworthy is a family of high strength steel fiber reinforcement products known as HARDWIRE®, commercially available, manufactured by Hardwire LLC, 1000 Quinn Avenue, Pocomoke City Md., 21851, website http://www.hardwirellc.com. Especially useful for inventive practice are the HARDWIRE® unidirectional high strength steel wire (fiber) tapes, such as those available in twelve-inch widths. Tests performed at the Naval Surface Warfare Center, Carderock Division (NSWCCD) have demonstrated HARDWIRE® to be easily processed and to have significant mechanical properties. NSWCCD investigators have shown that steel fiber reinforcement composite panels can be manufactured, using HARDWIRE® unidirectional steel fiber tapes, via a vacuum assisted resin transfer molding (VARTM) process. Available online beginning on or about 1 Mar. 2004 at the Hardwire LLC website, http://www.hardwirellc.com, is the following unpublished U.S. Navy technical report, incorporated herein by reference, which examines some material properties of certain specimens made using HARDWIRE®: Robert Matteson and Roger M. Crane, "Flexural Testing of Steel Wire Composite Beams Made with Hardwire™ Unidirectional Tape," NSWCCD-65-TR-2003/48, Naval Surface Warfare Center, Carderock Division, face-dated November 2003 but never published. In providing its unique composite-to-metal joint technology, the present invention brings to bear resin transfer molding (RTM) technology such as in a form of VARTM processing that is analogous to previously demonstrated VARTM processing of HARDWIRE® unidirectional steel fiber tapes. HARDWIRE® represents one product line that can be utilized propitiously in practicing the present invention; nevertheless, the ordinarily skilled artisan who reads the instant disclosure will appreciate that multifarious metallic fiber reinforcement articles other than HARDWIRE® articles lend themselves to inventive practice.

In accordance with typical embodiments of the present invention, a method is provided for effecting attachment between a first structure and a second structure. The first structure includes nonmetallic fibrous material. The second structure includes metallic material. The method comprises: (a) effecting a co-cure joint between the first structure and a first portion of an intermediate structure; and, (b) effecting a weld joint between the second structure and a second portion of the intermediate structure. The intermediate structure includes metallic fibrous material. According to many inventive embodiments, the effecting of a co-cure joint between the first structure and the first portion of the intermediate structure includes: (i) adjoining the first structure and the first portion of the intermediate structure; (ii) impregnating with resin the first structure and the first portion of the intermediate structure; and, (iii) curing the first structure and the first portion of the intermediate structure. According to many inventive embodiments, the effecting of a weld joint between the second structure and the second portion of the intermediate structure includes: (i) welding two metallic plates on opposite sides of the second portion of the intermediate structure; and, (ii) welding the second structure and the combination including the two metallic plates and the second portion of the intermediate structure.

Featured by typical embodiments of the present invention is the implementation of a metallic fibrous "preform" material (such as embodied by preform panels made from HARDWIRE® unidirectional steel fiber tapes) as a "transitional" material for coupling a nonmetallic fibrous "preform" material (such as embodied by preform panels made from conventional E-glass-woven roving or another glass fabric material) with a metallic nonfibrous material (typically a primary structural, monolithic material such as embodied by the metallic deck, or portion thereof, of a ship or other marine vessel). Two different joints—viz., a co-cure joint and a weld joint—are created at different locations (e.g., on opposite sides) of the metallic fibrous material so as to "transition" the nonmetallic fibrous material into the metallic nonfibrous material. The metallic fibrous material represents the "transitional" structure. The co-cure joint is created between the nonmetallic fibrous material and a first part of the metallic fibrous material. The weld joint is created between the metallic nonfibrous material and a second (separate) part of the metallic fibrous material. The fibrous structural characteristic, shared by the nonmetallic fibrous material and the metallic fibrous material, fosters their co-cure joining. The metallic structural characteristic, shared by the nonmetallic fibrous material and the metallic nonfibrous material, fosters their weld joining. The terms "metal" and "metallic," as used herein, refer in the broadest sense to any material including metal, such as an elemental metal material or an alloy material.

According to typical inventive practice, plural nonmetallic fiber reinforcement preform panels are stacked so as to overlap one another; similarly, plural metallic fiber reinforcement preform panels are stacked so as to overlap one other. Since, generally, the metallic fiber reinforcement preform panels should be appropriately dimensioned for participation in a co-cure bond in one section thereof and a weld joint in another section thereof, inventive practice will sometimes prefer to provide such panels that are elongated. The interlocking junction between the two fibrous stacks along their staggered edges describes a stepped (stepped lap) configuration. The two adjoining fibrous stacks (one nonmetallic, the other metallic) of preform material are "co-impregnated" (i.e., jointly impregnated—e.g., infiltrated or infused—in a single step) with a single resin system (e.g., a vinyl ester resin)—so that an exposed section of the metallic fibrous (e.g., HARDWIRE® steel wire) stack is not impregnated with resin. The adjoining, impregnated combination of panel preform stacks is "co-cured" (i.e., jointly cured, in a single step), this co-curing excluding the uninfiltrated metallic fibrous section. The co-cured combination of nonmetallic and metallic fibrous material represents a kind of "hybrid" fiber-reinforced matrix material system, in which a single resinous matrix system is used to infiltrate at least two different types of fiber reinforcement.

The uninfiltrated, uncured metallic fibrous section is capable of being welded to a separate metallic structure, thereby uniting the separate metallic structure (located at one end of the uninfiltrated, uncured metallic fibrous section) with the hybrid fiber-reinforced matrix material system (located at the opposite end of the uninfiltrated, uncured metallic fibrous section); in effect, this uniting accomplishes the attachment of the nonmetallic fibrous material (now infiltrated with resin) with respect to the separate metallic structure. According to frequent inventive practice, auxiliary metallic structure is welded to at least a portion of the uninfiltrated, uncured metallic fibrous section in order to facilitate "weldability" to another metallic structure (especially a larger, more "structural" body such as a steel ship deck). For instance, the uninfiltrated, uncured metallic fibrous section (e.g., a planar section of a stacked panel assembly) is welded on opposite sides to two metallic (e.g., steel) plates, thereby forming a sandwich configuration of uninfiltrated, uncured metallic fibrous material layer situated between two metallic plate layers. As an alternative approach, according to some inventive embodiments at least a portion of the uninfiltrated, uncured metallic fibrous section is welded on one side to one metallic (e.g., steel) baseplate. Thus enhanced by one or more metallic plates, the uninfiltrated, uncured metallic fibrous section (or a portion thereof) is especially capable of being attached by means of welding to a large metallic structure such as a steel ship deck.

The following paper, incorporated herein by reference, examines (using numerical method such as finite element analysis) stresses and strains associated with certain co-cured stepped joint configurations representative of inventive practice, wherein the two adherends of the co-cure joint are fiber-reinforced laminates of unequal stiffness, and wherein a continuous matrix surrounds the fibers on both sides of the co-cure joint: Stephen M. Graham, "Stress Analysis of a Co-Cured Innovative Hybrid Joint for Marine Composites," SAMPE (Society for the Advancement of Material and Process Engineering) 2004, 16-20 May 2004, Long Beach, Calif. The stiffness mismatch between the fibrous non-metallic material and the fibrous metallic material can pose a problem when these materials are co-cured in accordance with the present invention. This mismatch can lead to strain localization, which can cause matrix or fiber damage. As this area is loaded over time, the damage can accumulate and cause eventual failure. As disclosed by Graham, early analysis of the present invention's hybrid joint has shown that it can be designed to minimize the detrimental aspects of the stiffness mismatch. The following paper, incorporated herein by reference, examines tensile strengths associated with certain co-cured stepped joint configurations representative of inventive practice: Stephen M. Graham, Tad Robbins, and Roger M. Crane, "Influence of Joint Geometry on Tensile Strength of a Co-Cured Symmetric Stepped-Lap Joint," SAMPE (Society for the Advancement of Material and Process Engineering) 2005, 1-5 May 2005, Long Beach, Calif.

A typical co-cure joint in accordance with the present invention (in which a non-metal fiber material and a metal fiber material are joined together) is stronger than a co-cure joint in which two non-metal fiber materials are joined together, due to the markedly greater stiffness afforded by a metal fiber material as compared with a non-metal fiber material. This superiority in joint strength is attributable at least in part to the bending of the combined structure in the direction of the metal fiber (i.e., stiffer) material, which thus carries more of the load. Furthermore, the inventive co-cure joint will tend to be stronger than an adhesive joint, since the inventive co-cure joint involves no adhesive but rather involves a uniform matrix material, the loading therefore being more uniform with fewer stress concentrations. Through proper tailoring of the two different fiber systems (one metallic, one nonmetallic) that are joined via the present invention's co-cure joint, the present invention's hybrid composite configuration can be tailored to have a more efficient load transfer from the metal composite into the conventional composite with even further reduced stress concentrations. In inventive practice involving some marine deck applications, for instance, the present invention's metal fiber intermediary structure, in acting as a "transitional" vehicle between a composite and a steel deck, serves to reduce the stiffness mismatch between the composite and the steel deck. Since there is no fastening (e.g., bolting) or machining required, the cost and weight of the present invention's co-cure joint are significantly less than the cost and weight of a mechanical joint. The present invention's provision for welding to a metallic structure (e.g., steel substructure) will permit Page of conventional shipyard skills and practices to be used, further reducing the cost of the joining process. The present invention's obviation of fasteners (e.g., bolts) will provide reduced life cycle costs, since there is no need to check and re-torque the fasteners (e.g., bolts). Inventive practice can feature the hybridization, within individual panels, of high stiffness fiber along with conventional glass fiber, wherein the two fiber types are embedded together in a matrix such as a vinyl ester. These hybridized panel forms can afford greater stiffness and lesser volume as compared with conventional composite cored construction.

Other objects, advantages and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 7 is the view of the inventive integral hybrid panel shown in FIG. 6, wherein the two metallic plates are shown welded on opposite sides of the bare (unimpregnated, uncured) metallic fibrous material in the co-cure region. FIG. 7 illustrates the welding of the sandwich-welded co-cure region to a metallic structure such as a steel ship deck. The metallic plates shown in FIG. 7 are coextensive (i.e., cover all of) with the co-cure region.

FIG. 7A is the view of the inventive integral hybrid panel shown in FIG. 6A, wherein the two metallic plates are shown welded on opposite sides of the bare (unimpregnated, uncured) metallic fibrous material in the co-cure region. FIG. 7A illustrates the welding of the sandwich-welded co-cure region to a metallic structure such as a steel ship deck. The metallic plates shown in FIG. 7A are less than coextensive with (i.e., cover part of) the co-cure region.

DETAILED DESCRIPTION OF THE INVENTION

Figure 1:
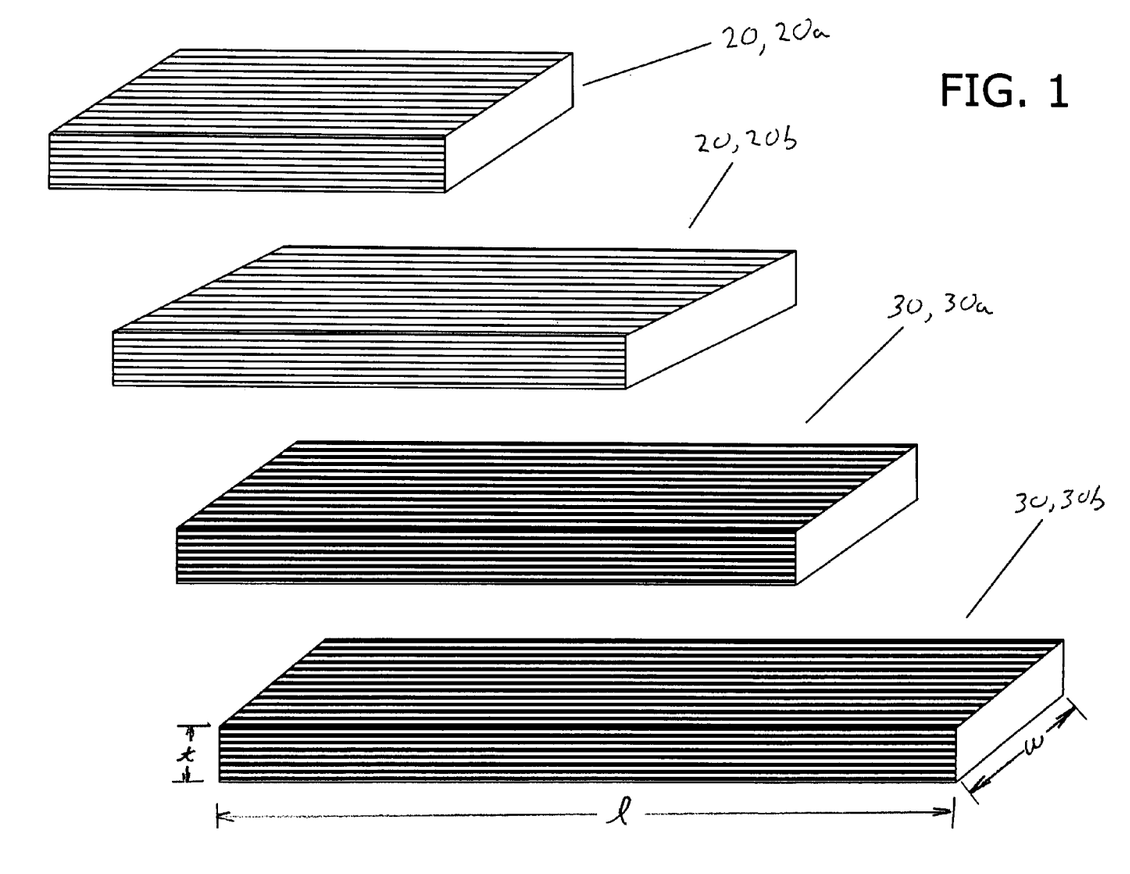
FIG. 1 is a perspective view of two nonmetallic fibrous perform panels and two metallic fibrous preform panels of equal widths and thicknesses and varying lengths.

Reference is now made to FIG. 1, which depicts two nonmetallic fibrous preform panels 20 (viz., 20a and 20b) and two metallic fibrous preform panels 30 (viz., 30a and 30b). The nonmetallic fiber panel preforms 20 are composed, for example, of E-glass woven roving. The metallic fiber panel preforms 30 are composed, for example, of HARDWIRE® unidirectional high strength steel wires. Panels 20 and 30 can be either single-ply or multi-ply. All four panel preforms 20 and 30 are characterized by the same width w and thickness t, but vary in length l.

Figure 2:
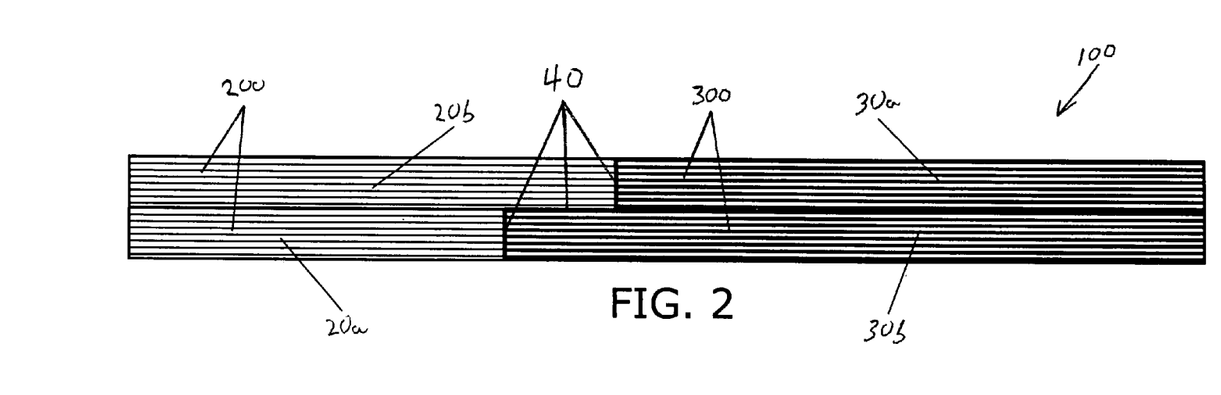
FIG. 2 is an elevation view of the contiguous arrangement of the four preform panels shown in FIG. 1 so as to form a stepped interface in accordance with the present invention.

With reference to FIG. 2, nonmetallic fiber panel performs 20a and 20b are stacked so as to be even at their lefthand edges and to be overlapping at their righthand edges. Similarly, metallic fiber panel preforms 30a and 30b are stacked so as to be even at their righthand edges and to be overlapping at their lefthand edges. The pair of overlapping nonmetallic fiber panel preforms 20a and 20b (at their staggered righthand edges) are adjoined with the pair of overlapping metallic fiber panel preforms 30a and 30b (at their staggered lefthand edges). The adjunction between the two overlapping nonmetallic fiber panel preforms 20a and 20b and the two overlapping metallic fiber panel preforms 30a and 30b describes a stepped interface 40, a two-step (double-step) configuration of uniform thickness. The term "stepped configuration" is used synonymously herein with the term "stepped lap configuration." It can be considered that the two abutting, overlapping nonmetallic fiber panel preforms 20a and 20b together form a combined nonmetallic fiber preform panel structure 200, and that the two abutting, overlapping metallic fiber panel preforms 30 together form a combined metallic fiber preform panel structure 300; combined nonmetallic fiber preform panel structure 200 and combined metallic fiber preform panel structure 300 together form an integral preform panel structure 100. Stepped interface 40 is thus established between the combined nonmetallic fiber preform panel structure 200 and the combined metallic fiber preform panel structure 300.

Figure 3:
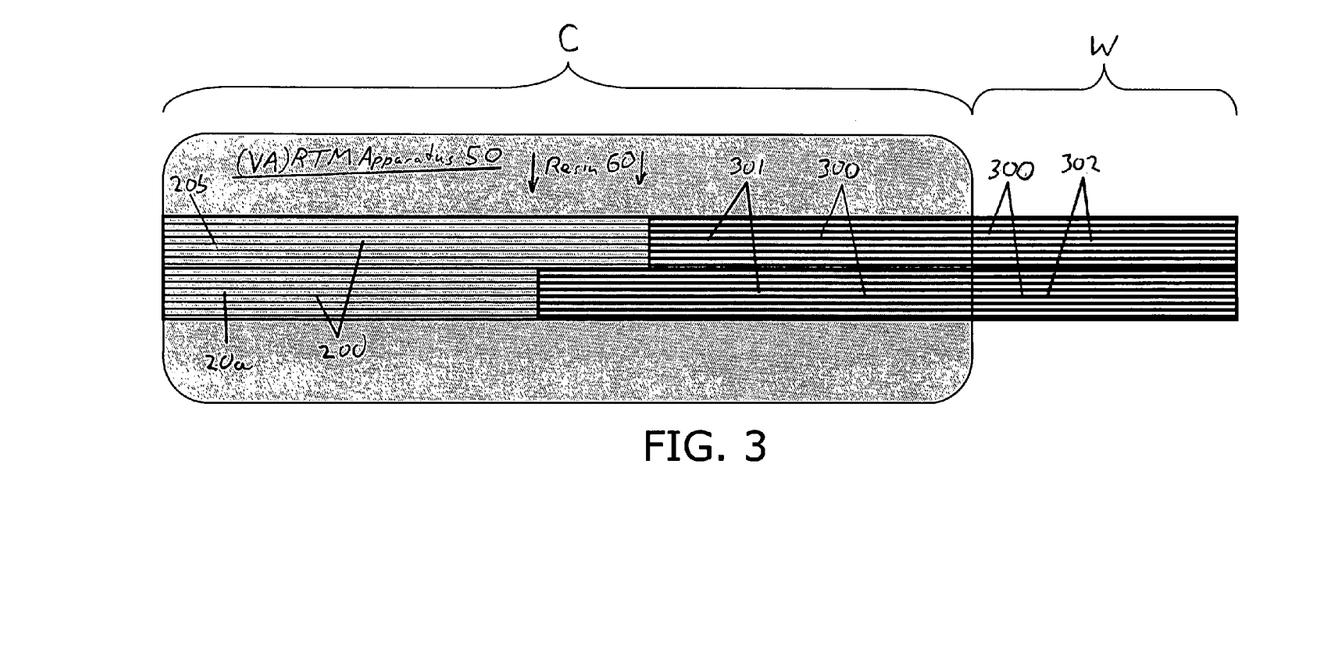
FIG. 3 is an elevation view, similar to the view of FIG. 2, illustrating the co-impregnation and co-curing, in accordance with the present invention, of the two nonmetallic fibrous preform panels and portions of the two metallic fibrous preform panels.

Both the combined nonmetallic fiber preform panel structure 200 and the combined metallic fiber preform panel structure 300 are composed essentially of dry fiber preform materials. Nonmetallic fiber preform panel structure 200 and portion 301 (which consists of abutting respective portions of metallic fiber panel preform 30a and metallic fiber panel preform 30b) of metallic fiber preform panel structure 300 are co-impregnated (e.g., co-infused) in a single impregnation step with a single resin system and are then co-cured (for instance, using VARTM or another conventional RTM technique), resulting in a continuous resinous matrix 60 encompassing two distinct fiber forms, namely, the nonmetallic fibers of preform panel structure 200 and the metallic fibers of portion 301 of preform panel structure 300. No resin 60 is permitted to flow into portion 302 (which consists of abutting respective portions of metallic fiber panel preform 30a and metallic fiber panel preform 30b) of metallic fiber preform panel structure 300, which defines a weld region W. RTM (e.g., VARTM) apparatus 50 is diagrammatically shown as circumscribing nonmetallic preform panel structure 200 and portion 301 of preform panel structure 300, the combination of which defines a co-cure region C. The two overlapping nonmetallic fiber panel preforms 20 and the two overlapping metallic fiber panel preforms 30 are thus joined together via the impregnation; in particular, nonmetallic fiber preform panel structure 200 (formed by the two overlapping nonmetallic fiber panel preforms 20a and 20b) and metallic fiber preform panel structure 300 (formed by the two overlapping nonmetallic fiber panel preforms 30a and 30b) are joined together at stepped interface 40 via the impregnation of resin 60 and in the absence of any other bonding methodology such as involving adhesive material, mechanical fastening, or secondary bonding.

Figure 4:
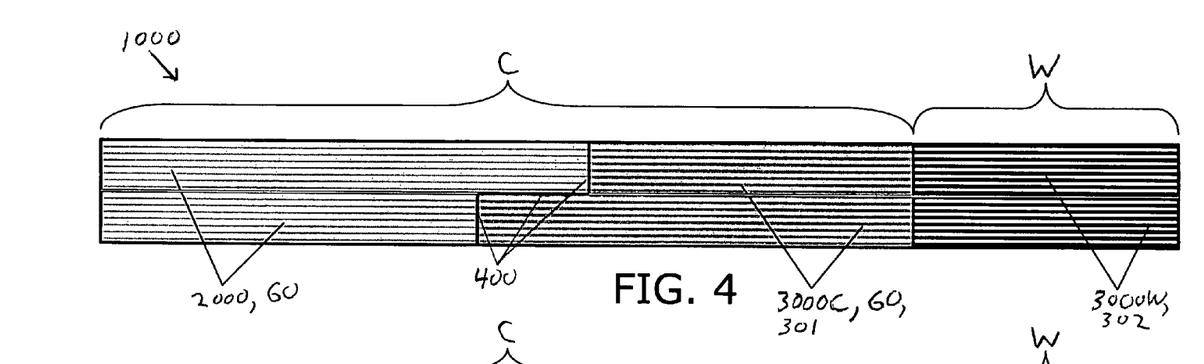
FIG. 4 is an elevation view, similar to the views of FIG. 2 and FIG. 3, of an inventive integral hybrid panel describing a co-cure region (including the co-impregnated and co-cured combination of the two nonmetallic fibrous preform panels and the respective portions of the two metallic fibrous preform panels) and a weld region (including an unimpregnated, uncured portion of the respective portions of the two metallic fibrous perform panels).
Figure 5:
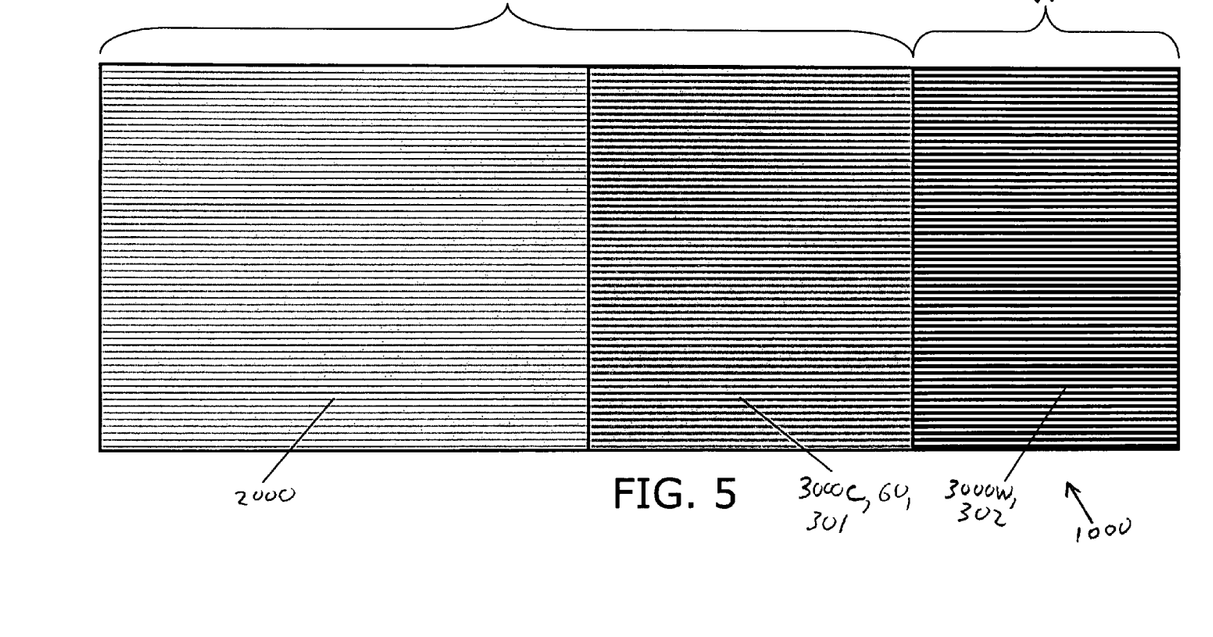
FIG. 5 is a plan view of the inventive integral hybrid panel shown in FIG. 4.

Referring to FIG. 4 and FIG. 5, fabricated via the above-described co-cure process is an integral hybrid composite panel 1000 that includes a nonmetallic fiber-reinforced matrix section 2000C, a metallic fiber-reinforced matrix section 3000C, and a bare metallic fiber section 3000W. Co-cure region C is commensurate with nonmetallic fiber-reinforced matrix section 2000C in combination with metallic fiber-reinforced matrix section 3000C (i.e., portion 301). Weld region W is commensurate with bare metallic fiber section 3000W (i.e., portion 302). Via the impregnation and cure processing, the unimpregnated and uncured stepped interface 40 has become an impregnated and cured stepped interface 400 characterized by a co-cure joining of nonmetallic fiber preform panel structure 200 and metallic fiber preform panel structure 300.

Figure 6:
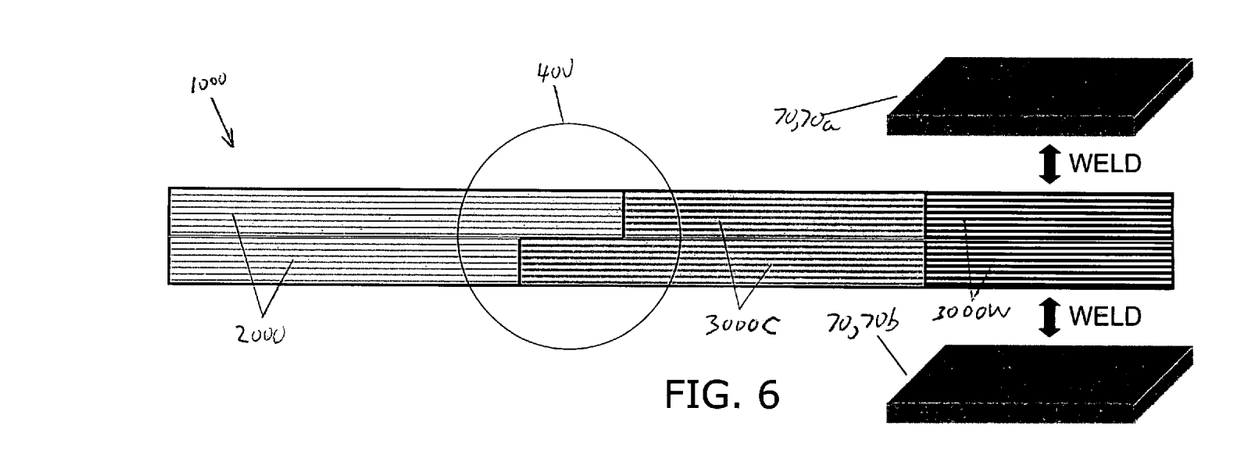
FIG. 6 is the view of the inventive integral hybrid panel shown in FIG. 4, illustrating the sandwich-welding of two metallic plates. The metallic plates shown in FIG. 6 are coextensive with the co-cure region.
Figure 6A:
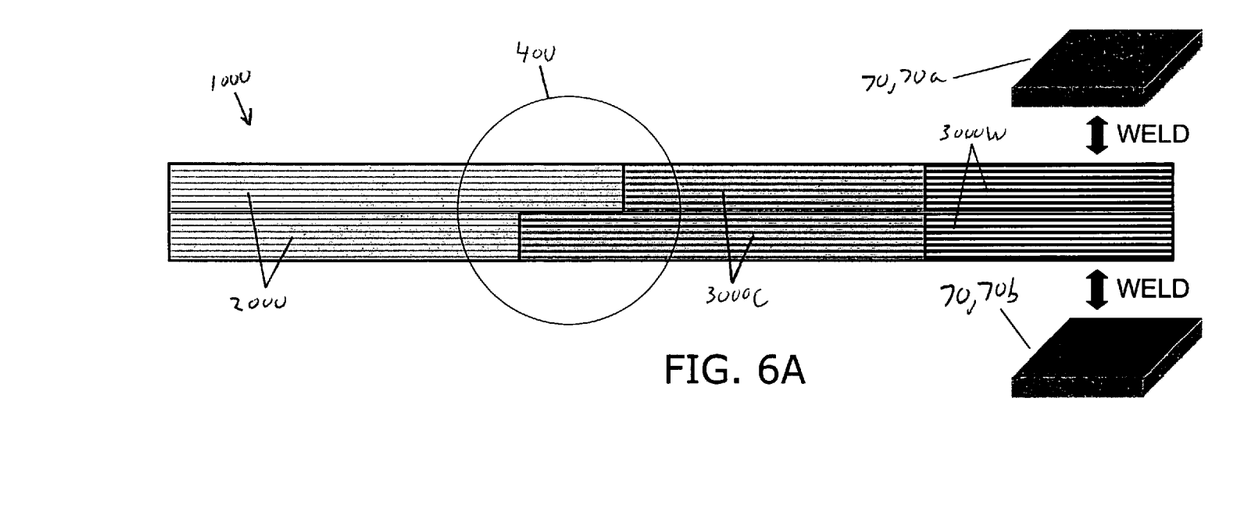
FIG. 6A is the view, similar to the view of FIG. 6, of the inventive integral hybrid panel shown in FIG. 4, illustrating the sandwich-welding of two metallic plates that are shorter than those shown in FIG. 6.
Figure 7:
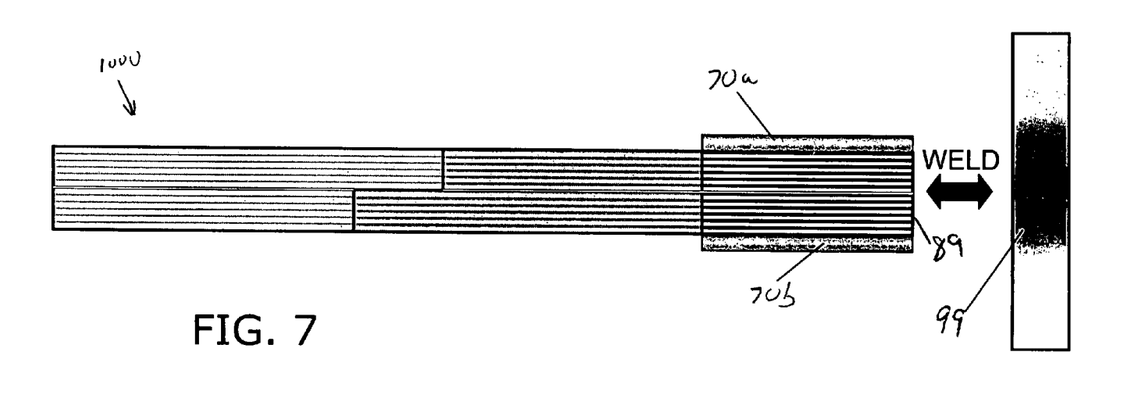
Figure 7A:
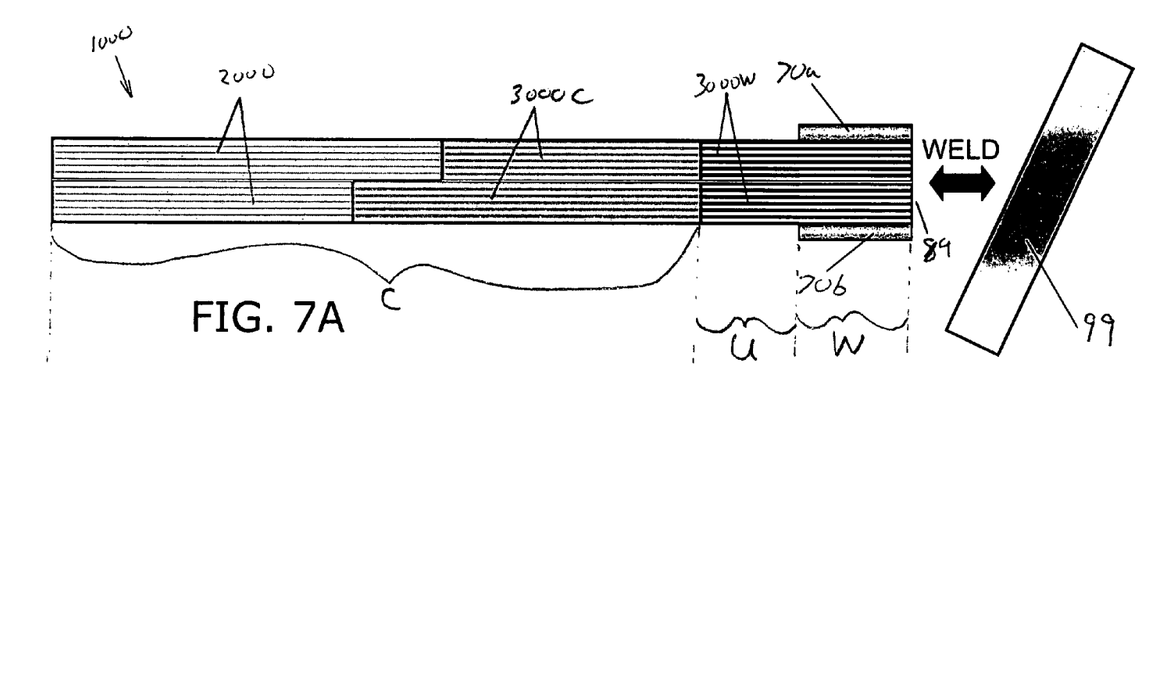
Figures 8, 8A:
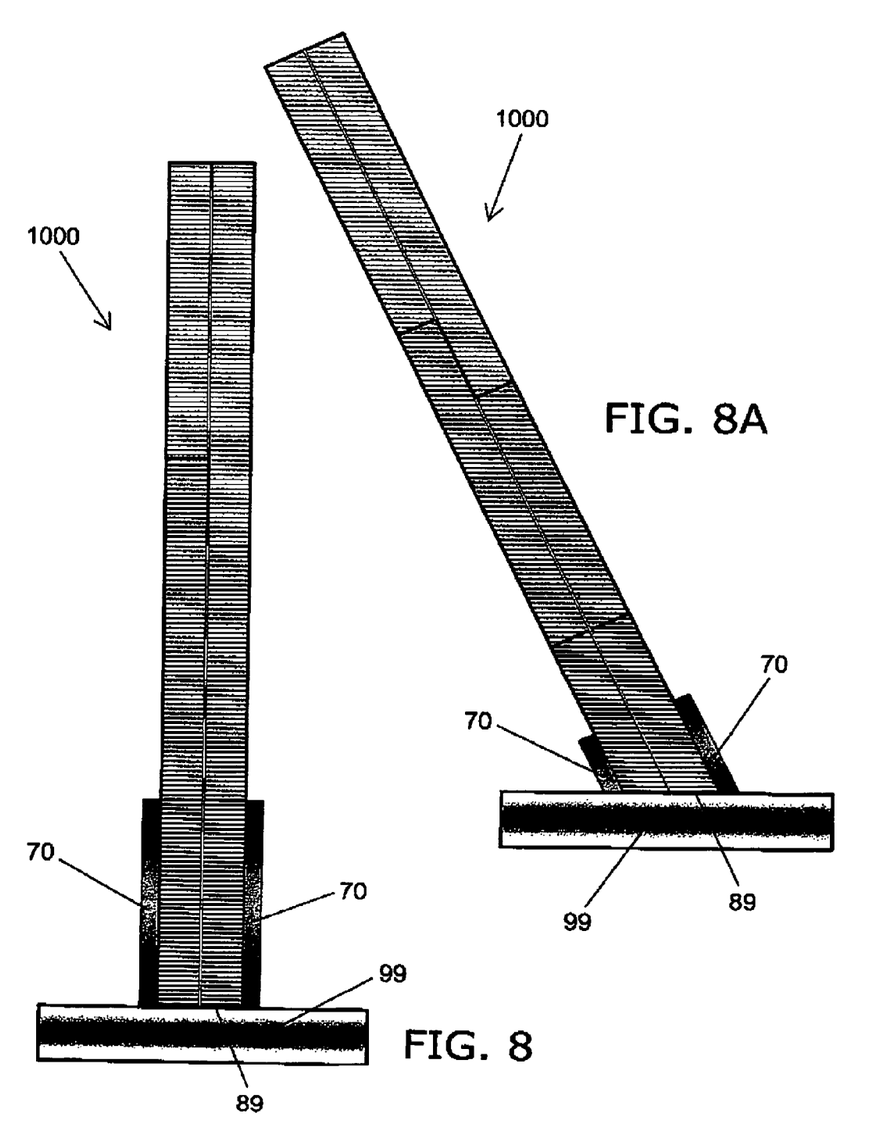
FIG. 8 is the view of the inventive integral hybrid panel and the metallic structure shown in FIG. 7, wherein the inventive integral hybrid panel and the metallic structure are shown welded together.
FIG. 8A is the view of the inventive integral panel and the metallic structure shown in FIG. 7A, wherein the inventive integral hybrid panel and the metallic structure are shown welded together.

Reference is now made to FIG. 6, FIG. 7, FIG. 8, FIG. 6A, FIG. 7A and FIG. 8A. The bare metallic fibrous (e.g., HARDWIRE®) material is sandwiched between metallic (e.g., steel) plates and is then welded thereto to form a single metallic piece. This welded combination is then welded to the metallic substrate (e.g., steel deck). FIG. 6, FIG. 7 and FIG. 8 illustrate a welding process involving two approximately congruent sandwich plates 70 that are each approximately coextensive with metallic fiber-reinforced matrix section 3000C. FIG. 6A, FIG. 7A and FIG. 8A illustrate a welding process involving two sandwich plates 70 that are each significantly shorter than metallic fiber-reinforced matrix section 3000C (roughly half the length of metallic fiber-reinforced matrix section 3000C, as shown in FIG. 6A, FIG. 7A and FIG. 8A). As shown in FIG. 6, FIG. 7 and FIG. 8, in the weld region W, two metallic (e.g., steel) weld plates 70 that are approximately coextensive with metallic fiber-reinforced matrix section 3000C are welded onto opposite sides (faces) of metallic fiber-reinforced matrix section 3000C, which includes no resin and consists only of bare steel wire material. The bare steel wire material of metallic fiber-reinforced matrix section 3000C is sandwiched between the two plates 70a and 70b by means of known welding technique such as tungsten gas metal arc welding or friction stir welding, thereby forming, in weld region W, a single or unified metallic material that includes the two metallic sandwich plates 70 and the metallic fiber-reinforced matrix section 3000C.

Subsequently, the welded combination of the two metallic sandwich plates 70 and the metallic fiber-reinforced matrix section 3000C is welded to a metallic structure 99 (e.g., a steel marine deck) using known welding technique (e.g., tungsten gas metal arc welding or friction stir welding); hence, welded together in weld region W are the two metallic sandwich plates 70, the metallic fiber-reinforced matrix section 3000C, and at least a portion of the metallic structure 99. Thus accomplished, in effect, is the attachment of a nonmetallic fiber-reinforced composite structure 2000 with respect to a metallic structure 99 in the absence of adhesive bonding or mechanical fastening. The procedure depicted in FIG. 6A, FIG. 7A and FIG. 8A sequence parallels the procedure depicted in FIG. 6, FIG. 7 and FIG. 8 sequence, except that in the former drawing sequence the metallic sandwich plates are shown to cover only a portion of the metallic fiber-reinforced matrix section 3000C, thus leaving an unwelded bare metallic fiber region U that lies adjacent to and between the co-cure region C and the weld region W. Furthermore, FIG. 7 and FIG. 8 depict weld attachment at a longitudinal end edge 89 in weld region W of the integral hybrid composite panel 1000 so that the integral hybrid composite panel 1000 is situated normal (perpendicular) with respect to the metallic structure 99; conversely, FIG. 7A and FIG. 8A depict weld attachment at an appropriately adapted longitudinal end edge 89 in weld region W of the integral hybrid composite panel 1000 so that the integral hybrid composite panel 1000 is situated oblique with respect to the metallic structure 99. The oblique end edge 89 shown in FIG. 8A can be engineered either subsequent to (e.g., machined) or during the fabrication of the integral hybrid composite panel 1000.

Figure 9:
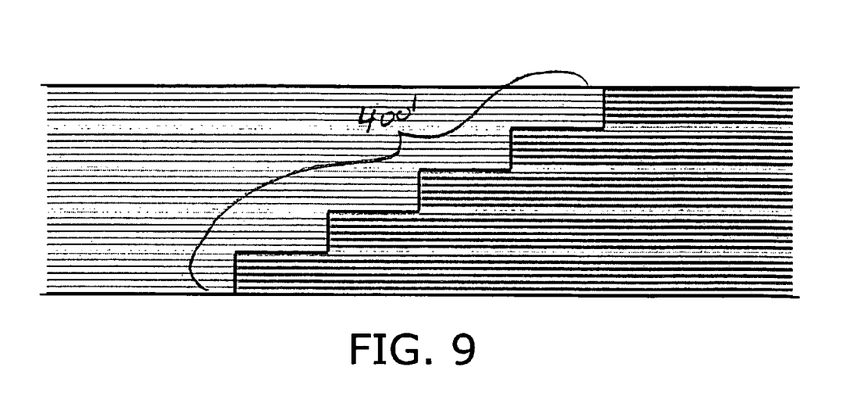
FIG. 9, FIG. 10 and FIG. 11 are three examples among the multifarious stepped interface configurations that can be inventively practiced in the co-cure region of an inventive integral hybrid panel. The stepped interface configuration shown in FIG. 9, FIG. 10 and FIG. 11 are but three alternatives to the two-step interface, uniform thickness configuration shown in FIG. 4 through FIG. 8A, indicated by encirclement in FIG. 6 and FIG. A).
Figure 10:
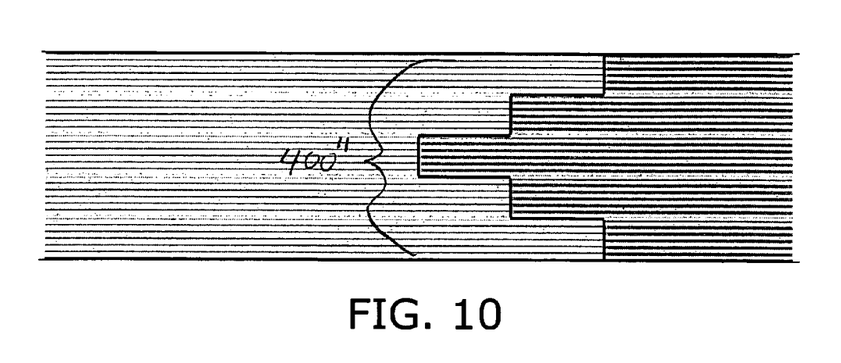
Figure 11:
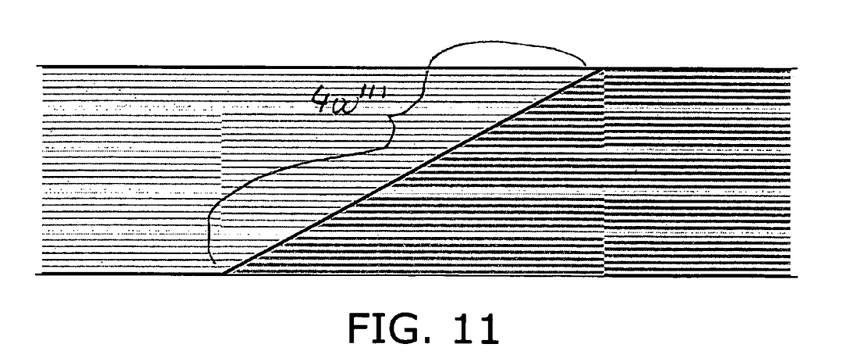

Stepped interface 400 shown in FIG. 4 and other figures represents a simple case of a two-step, uniform-thickness, interface 400 configuration. With reference to FIG. 9 through FIG. 11, diverse interface 400 stepped configurations are possible in accordance with the present invention. FIG. 9 depicts stepped interface 400', an asymmetrical five-step configuration. FIG. 10 depicts stepped interface 400", a symmetrical five-step configuration. FIG. 11 depicts scarfed interface 400''', an asymmetrical scarf joint-like interface that is tantamount to an asymmetrical stepped interface having numerous or infinite steps. The ordinarily skilled artisan who reads the instant disclosure will recognize the variety of possibilities for inventive practice with regard to the joint configuration at the co-cure interface between nonmetallic fibrous material and metallic fibrous material.

Figure 12:
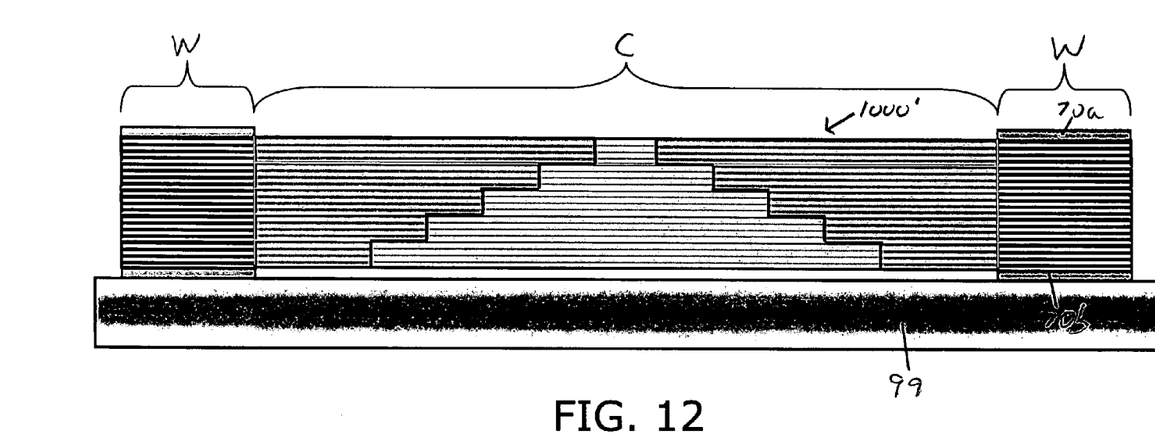
FIG. 12, FIG. 13 and FIG. 14 are three examples among the multifarious embodiments of an overall inventive structure representing the association of an inventive integral hybrid panel with a metallic structure such as a steel ship deck.
Figure 13:
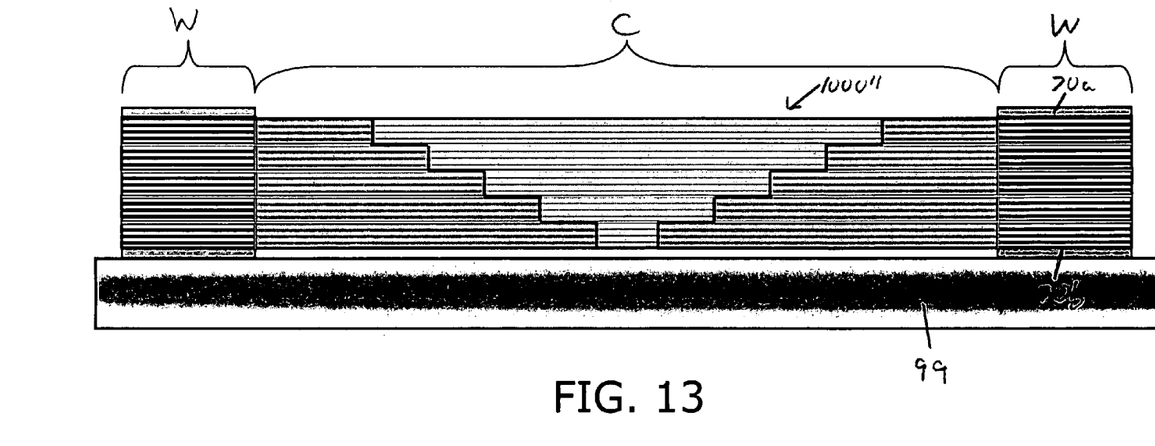
Figure 14:
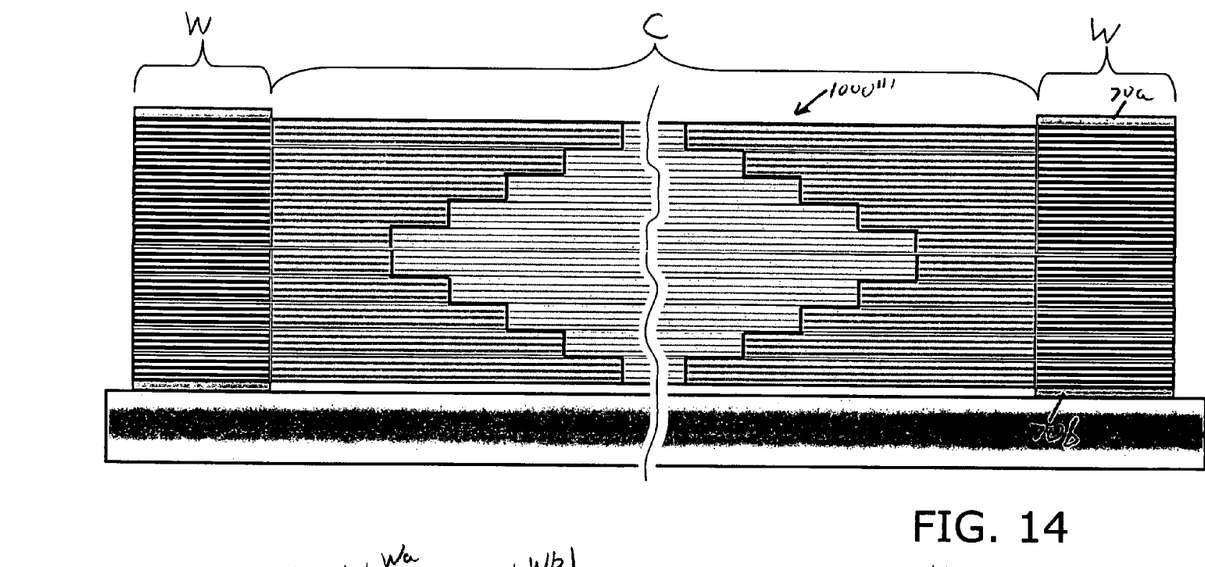

With reference to FIG. 12 through FIG. 14, in each of these figures an inventive hybrid composite panel has two extreme weld regions W and a co-cure region C therebetween. In FIG. 12 and FIG. 13, the co-cure region C (of inventive panel 1000' in FIG. 12 and inventive panel 1000" in FIG. 13) is characterized by lateral symmetry described by two height-wise asymmetrical step configurations 400. The laterally symmetrical dual step joint pattern is inverted in FIG. 13 versus FIG. 12. In FIG. 14, the co-cure region C of inventive hybrid panel 1000''' is characterized both by lateral symmetry and height-wise symmetry. Note that in FIG. 12 through FIG. 14 the weld to a metallic structure 99 is effected so that the bottom surface of bottom metallic plate 70b abuts the top surface of metallic structure 99. Such embodiments may obviate the need for welding a top metallic plate 70a onto the bare metallic fibrous material of the inventive hybrid panel. FIGS. 12 through 14 are not intended to portray preferred inventive embodiments, but rather are intended to merely illustrate a few more of the multifarious configurational possibilities involving attachment of an inventive hybrid structure with respect to a metallic structure in accordance with the present invention.

Figure 15:
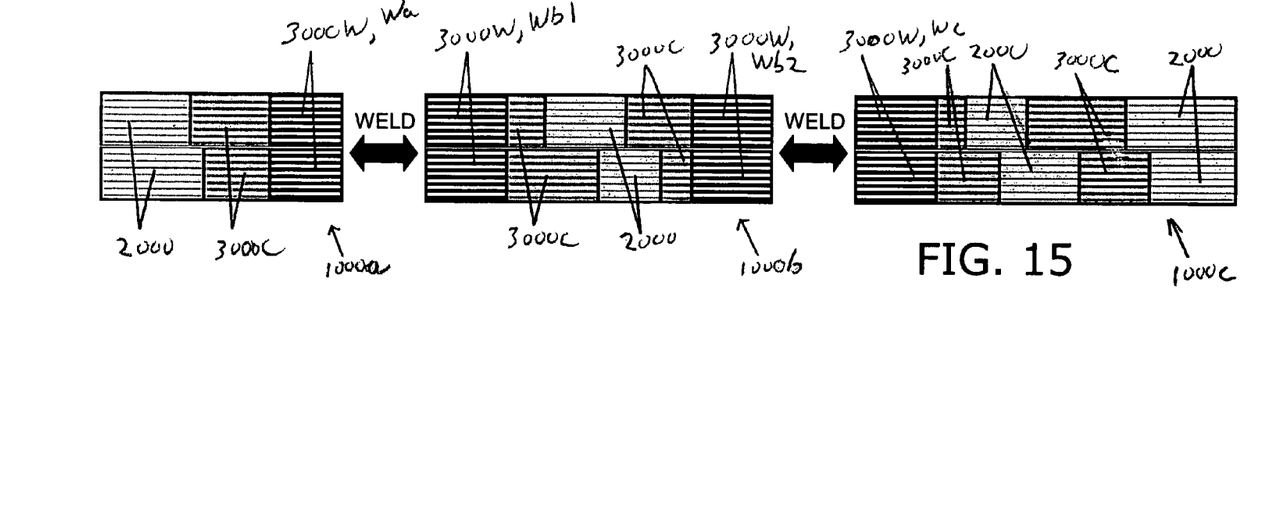
FIG. 15 illustrates inventive practice according to which plural inventive integral hybrid panels are connected end-to-end via welding of respective bare (i.e., unimpregnated and uncured) metallic fibrous sections. Two of the shown inventive integral hybrid panels are "multi-sectioned" in the sense of having plural nonmetallic fibrous sections that are impregnated and cured, plural metallic fibrous sections that are impregnated and cured, and at least one metallic fibrous section that is bare.

Now referring to FIG. 15, three different inventive hybrid panels—viz., panels 1000a, 1000b and 1000c—are welded together, end to end, at their corresponding weld regions. Inventive panel 1000a has weld region Wa; inventive panel 1000b has weld regions Wb1 and Wb2; inventive panel 1000c has weld region Wc. Weld region Wa of inventive panel 1000a is welded to weld region Wb1 of inventive panel 1000b; weld region Wc of inventive panel 1000c is welded to weld region Wb2 of inventive panel 1000b. FIG. 15 is diagrammatically representative of inventive embodiments in which two or more inventive hybrid structures are welded together at their respective bare metallic fibrous material sections. The present invention thus provides, in addition to a unique composite-to-metal attachment methodology, a unique composite-to-composite attachment methodology. FIG. 15 is also illustrative of inventive practice in which an inventive hybrid panel includes, in addition to at least one unimpregnated and uncured metallic fiber section, plural impregnated and cured nonmetallic fiber sections and plural impregnated and cured metallic fiber sections, wherein unlike material sections are alternately arranged. Some inventive hybrid panel embodiments are thus characterized by a propitious mix of lesser stiffness fiber-reinforced composite (wherein the fibers are nonmetallic) along with greater stiffness fiber-reinforced composite (wherein the fibers are metallic). An inventive hybrid composite panel with such or similar inventive features can offer material and structural qualities in terms of both strength and lightness in weight.

The present invention, which is disclosed herein, is not to be limited by the embodiments described or illustrated herein, which are given by way of example and not of limitation. Other embodiments of the present invention will be apparent to those skilled in the art from a consideration of the instant disclosure or from practice of the present invention. Various omissions, modifications and changes to the principles disclosed herein may be made by one skilled in the art without departing from the true scope and spirit of the present invention, which is indicated by the following claims.

What is claimed is:

1. A method for effecting attachment between a first structure and a second structure, said first structure including nonmetallic fibrous material, said second structure including metallic material, said method comprising:
   effecting a co-cure joint between said first structure and a first portion of an intermediate structure; and
   effecting a weld joint between said second structure and a second portion of said intermediate structure;
   wherein said intermediate structure includes metallic fibrous material.

2. The method for effecting attachment as recited in claim 1, wherein said effecting of a co-cure joint between said first structure and said first portion of said intermediate structure includes:
   adjoining said first structure and said first portion of said intermediate structure;
   impregnating with resin said first structure and said first portion of said intermediate structure; and
   curing said first structure and said first portion of said intermediate structure.

3. The method for effecting attachment as recited in claim 1, wherein said effecting of a weld joint between said second structure and said second portion of said intermediate structure includes:
   welding two metallic plates on opposite sides of said second portion of said intermediate structure; and
   welding said second structure and the combination including said two metallic plates and said second portion of said intermediate structure.

4. The method for effecting attachment as recited in claim 3, wherein said effecting of a co-cure joint between said first structure and said first portion of said intermediate structure includes:
   adjoining said first structure and said first portion of said intermediate structure;
   impregnating with resin said first structure and said first portion of said intermediate structure; and
   curing said first structure and said first portion of said intermediate structure.

5. A method for making a composite structure, said method comprising:
   adjoining a nonmetallic preform and a first portion of a metallic preform so as to form an interface between said nonmetallic preform and said first portion of said metallic preform;

impregnating with a matrix material said nonmetallic preform and said first portion of said metallic preform;

co-curing the impregnated said nonmetallic preform and the impregnated said first portion of said metallic preform so as to establish a bond at said interface; and welding a metallic structure and a second portion of said metallic preform, said second portion of said metallic preform having not been subjected to said impregnating and said co-curing.

6. The method for making a composite structure as defined in claim 5, wherein:

said nonmetallic preform includes plural nonmetallic fiber reinforcement panels;

said metallic preform includes plural metallic fiber reinforcement panels;

said adjoining includes arranging said nonmetallic fiber reinforcement panels and said metallic fiber reinforcement panels so that said interface describes a stepped configuration.

7. The method for making a composite structure as defined in claim 6, wherein said arranging includes:

stacking said nonmetallic fiber reinforcement panels so that each said nonmetallic fiber reinforcement panel has an edge that is staggered with respect to an edge of an adjacent said nonmetallic fiber reinforcement panel;

stacking said metallic fiber reinforcement panels so that each said metallic fiber reinforcement panel has an edge that is staggered with respect to an edge of an adjacent said metallic fiber reinforcement panel; and interlocking said nonmetallic fiber reinforcement panels and said metallic fiber reinforcement panels at their respective edges.

8. The method for making a composite structure as defined in claim 7, wherein said welding includes performance of a first weld and performance of a second weld, said first weld being of a pair of metallic plates onto opposite surfaces of said second portion of said metallic preform, said opposite surfaces being respective areas of the opposite faces of the two extremely stacked said nonmetallic fiber reinforcement panels, said second weld being of said metallic structure with respect to said second portion of said metallic preform with said metallic plates.

9. The method for making a composite structure as defined in claim 5, wherein:

said nonmetallic preform includes at least three nonmetallic fiber reinforcement panels;

said metallic preform includes at least three metallic fiber reinforcement panels;

said adjoining includes arranging said nonmetallic fiber reinforcement panels and said metallic fiber reinforcement panels so that said interface describes an asymmetrical stepped configuration.

10. The method for making a composite structure as defined in claim 9, wherein said arranging includes:

stacking said nonmetallic fiber reinforcement panels so that each said nonmetallic fiber reinforcement panel has an edge that is staggered with respect to an edge of an adjacent said nonmetallic fiber reinforcement panel;

stacking said metallic fiber reinforcement panels so that each said metallic fiber reinforcement panel has an edge that is staggered with respect to an edge of an adjacent said metallic fiber reinforcement panel; and interlocking said nonmetallic fiber reinforcement panels and said metallic fiber reinforcement panels at their respective edges.

11. The method for making a composite structure as defined in claim 10, wherein said welding includes performance of a first weld and performance of a second weld, said first weld being of a pair of metallic plates onto opposite surfaces of said second portion of said metallic preform, said opposite surfaces being respective areas of the opposite faces of the two extremely stacked said nonmetallic fiber reinforcement panels, said second weld being of said metallic structure with respect to said second portion of said metallic preform with said metallic plates.

12. The method for making a composite structure as defined in claim 5, wherein:

said nonmetallic preform includes at least three nonmetallic fiber reinforcement panels;

said metallic preform includes at least three nonmetallic fiber reinforcement panels;

said adjoining includes arranging said nonmetallic fiber reinforcement panels and said metallic fiber reinforcement panels so that said interface describes a symmetrical stepped configuration.

13. The method for making a composite structure as defined in claim 12, wherein said arranging includes:

stacking said nonmetallic fiber reinforcement panels so that each said nonmetallic fiber reinforcement panel has an edge that is staggered with respect to an edge of an adjacent said nonmetallic fiber reinforcement panel;

stacking said metallic fiber reinforcement panels so that each said metallic fiber reinforcement panel has an edge that is staggered with respect to an edge of an adjacent said metallic fiber reinforcement panel; and interlocking said nonmetallic fiber reinforcement panels and said metallic fiber reinforcement panels at their respective edges.

14. The method for making a composite structure as defined in claim 13, wherein said welding includes performance of a first weld and performance of a second weld, said first weld being of a pair of metallic plates onto opposite surfaces of said second portion of said metallic preform, said opposite surfaces being respective areas of the opposite faces of the two extremely stacked said nonmetallic fiber reinforcement panels, said second weld being of said metallic structure with respect to said second portion of said metallic preform with said metallic plates.

* * * * *